US007118066B2

(12) United States Patent
Allen (10) Patent No.: US 7,118,066 B2
(45) Date of Patent: Oct. 10, 2006

(54) TALL V/STOL AIRCRAFT (76) Inventor: Norman Carter Allen, 1518 So. Fordham St., Perryton, TX (US) 79070

( * ) Notice: Subject to any disclaimer, the term of this patent is extended or adjusted under 35 U.S.C. 154(b) by 69 days.

(21) Appl. No.: 10/896,138

(22) Filed: Jul. 22, 2004

(65) Prior Publication Data

US 2006/0032970 A1    Feb. 16, 2006

(51) Int. Cl.
*B64C 29/00*    (2006.01)
(52) U.S. Cl. .................... 244/7 B; 244/7 C
(58) Field of Classification Search ............ 244/10, 244/6, 7 C, 7 B, 12.4
See application file for complete search history.

(56) References Cited

U.S. PATENT DOCUMENTS

| | | | |
|---|---|---|---|
| 3,035,789 A * | 5/1962 | Young | 244/7 C |
| 3,107,882 A * | 10/1963 | Matteson et al. | 244/7 C |
| 3,117,745 A * | 1/1964 | Ellis, III et al. | 244/7 C |
| 3,136,499 A * | 6/1964 | Kessler | 244/7 C |
| 3,179,352 A * | 4/1965 | Nelson | 244/7 C |
| 3,184,181 A * | 5/1965 | Kaplan | 244/7 C |
| 3,197,157 A * | 7/1965 | King | 244/7 C |
| 3,329,376 A * | 7/1967 | Sullivan | 244/12.4 |
| D311,719 S * | 10/1990 | Haga | D12/328 |
| 5,096,140 A * | 3/1992 | Dornier, Jr. | 244/7 C |
| 5,141,176 A * | 8/1992 | Kress et al. | 244/7 C |
| 5,405,105 A * | 4/1995 | Kress | 244/7 C |
| 6,607,161 B1 * | 8/2003 | Krysinski et al. | 244/7 A |

* cited by examiner

*Primary Examiner*—Timothy D. Collins (57) ABSTRACT

A vertical or short takeoff and landing (V/STOL) airplane is described having a vertical form factor. Making the airplane tall has many advantages when operating in hover mode close to the ground. Several variations of the design are described. The preferred embodiment consists of two tall fuselage structures having an airfoil shape in plan view. As high above the ground as practical a "lift wing" spans the space between these fuselages. This wing may be equipped with lift augmentation systems to facilitate V/STOL flight. In the center of the span on the leading edge of the lift wing is placed a turboprop engine. Alternatively, the wing and attached engine can be made to tilt about a horizontal axis. For takeoff the wing will be tilted skyward. A second wing slightly below and behind the lift wing has a pusher engine located on the trailing edge. This lower wing and engine is also able to tilt about a horizontal axis parallel to the lift wing. During takeoff this lower engine is pointed downward toward the ground. This lower wing contains aerodynamic control surfaces to provide attitude and position control. Subsequent to liftoff the wings and engines tilt into a horizontal position to provide cruise lift and thrust. At the end of the flight the wings and attached engines are tilted back to provide vertical lift for hover, maneuvering, and soft landing.

6 Claims, 9 Drawing Sheets

Figure 2

Looking Along (+Y)   Looking Along (-X)

6A

6B

6C

Figure 6  Cruise Flight Control

Fig 7A
(2 views)

Fig 7B
(3 views)

Side Force

Tilting Moment

Figure 7 Hover Flight Control

Figure 8 Hover Translation

Figure 9

TALL V/STOL AIRCRAFT

DISCUSSION OF PRIOR ART

Background of the Invention

The advantages of having a vertical and short takeoff and landing (V/STOL) airplane have been amply described in the aeronautical literature[i]. A few of the more obvious reasons include economic use of the land in and around densely populated areas, reduced noise pollution, air service to suburban and rural communities as well as undeveloped countries, economic savings through flying more direct routes with more flexibility, and increased safety of flight operations. The justifications for use by the military are also strong. Despite all this only two VTOL airplanes are now operational, the military Harrier and the Osprey V-22, which is just now coming into, the commercial market as the Bell-Boeing 609. These airplanes are economically questionable due to limited payload capability and the high cost of manufacture, operation and maintenance. The aeronautical community has worked on the V/STOL design challenge since the early 1950's. Despite considerable funding in research of various concepts the development of a robust military or commercial design has not occurred. This is because there are many technical problems facing the V/STOL designer. In only the last few decades have power plants been available that could support vertical flight. Jet engines of high specific horsepower are now available, but they exhibit very high velocity, hot-gas exhaust, which may damage or destroy a ground surface if it is in close proximity and at high incidence angles to the engine nozzle and this can result in the damage debris being circulated back into the engine inlet. Turboprop power plants have cooler lower velocity exhaust streams, producing a lower velocity boundary layer on the ground, but pay a specific thrust penalty because of gearbox and propeller losses. Current designs operate their jets and turboprops in close proximity to the ground. Present designs have multiple downwash columns which can produce "air fountain" interference effects that adversely interact with the airplane structure and result in control complications for the pilot, —and in severe cases, loss of the aircraft. Rapid loss of lift can occur during STOL landing operations if powered re-circulating air gets trapped under a lifting surface. Another risk is in rapid descending flight where one rotor, of an aircraft configuration like the V-22, encounters stall conditions and sends the aircraft into a violent rotation. In some designs (e.g. V-22 Osprey) the downwash column in hover mode loses considerable lift because it impinges on the plan form of the cruise lift wing. Current tilt-rotor and tilt-wing designs utilize propellers and engines on each side of a single wing (e.g., Bell Boeing V-22, Osprey; LTV-Hiller-Ryan XC-142) and must have a cross-shaft for engine failure safety. This cross shaft adds weight, complexity, and is itself a possible source of critical failure. The XC-142 had to have a set of propellers installed on the tail to provide vertical force to offset severe pitch forces when the wings were tilted for slow/vertical flight and differential thrust on the outboard propellers and differential ailerons for control of pitch making piloting difficult and stressful. The prop rotor design on airplanes like the V-22 is complicated by the requirement to incorporate cyclic as well as collective lift control into the propeller mechanism. The cyclic control is necessary to provide control when operating in hover mode and increases the cost and risk of failure in these propellers. The delay time for this cyclic control to respond to lateral disturbances may limit the conditions that this aircraft can deal with. It is quite difficult in many of the previous aircraft designs for the pilot to maintain control during transitions of the lift systems from takeoff to cruise and then to landing. All these previous designs are unstable near the ground during takeoff and landing, particularly in gusty wind conditions, and attitude control relies on slow, sometimes completely dedicated, lift augmentation generation systems making design and testing very difficult. Some designs are unable to perform STOL flight while others cannot move themselves around on the ground. The safety requirement for the crew and passengers when there is partial loss of power has overly complicated the design of these past and present airplanes.

OBJECTS AND ADVANTAGES

Brief Summary of Invention

Figures 1, 1A, 1B, 1C:
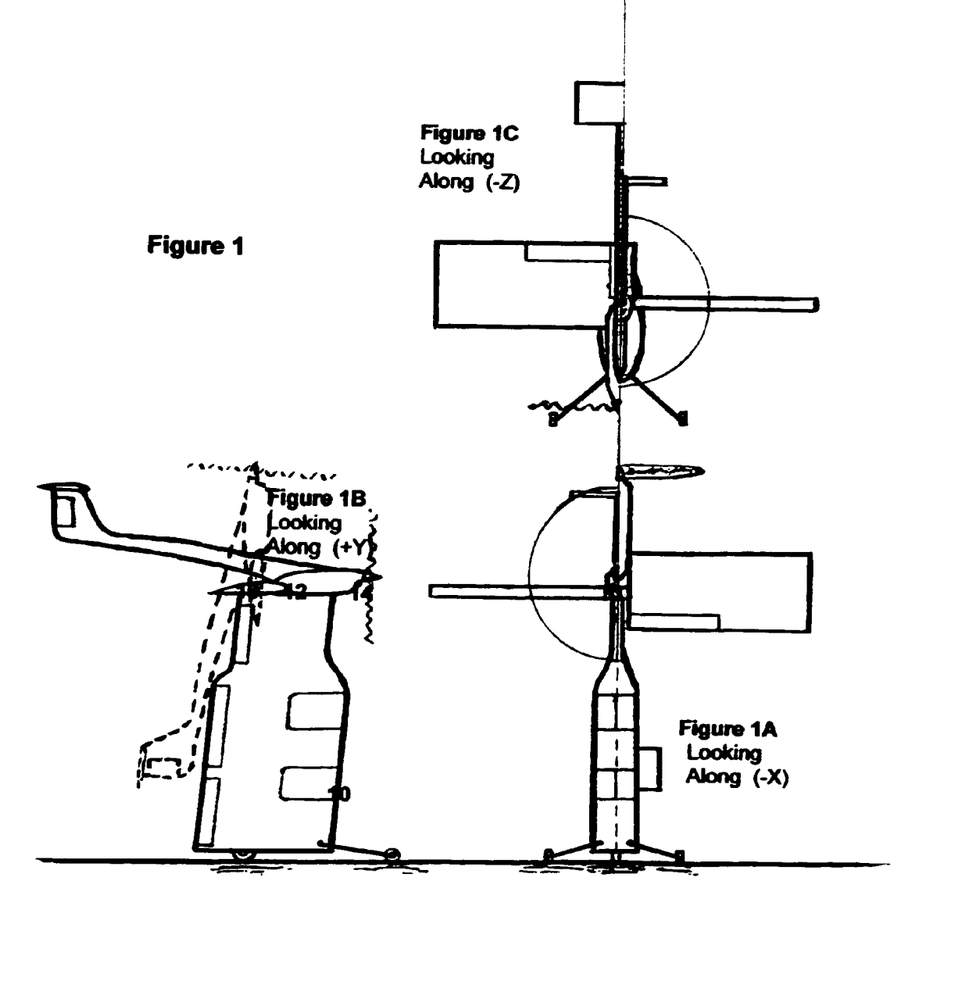
FIG. 1 A side, plan and front view of a single fuselage, single wing, single engine airplane.
Figure 2A:
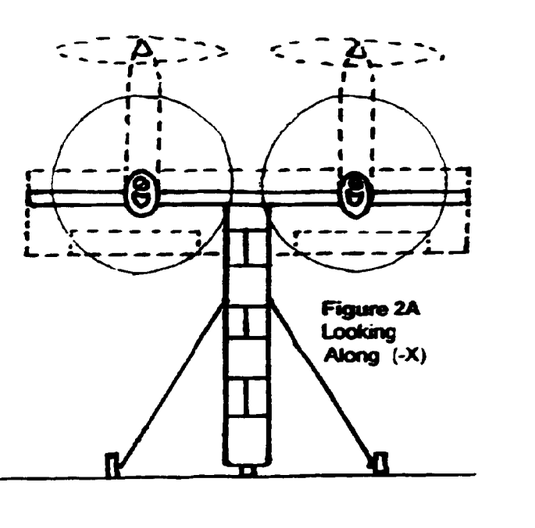
FIG. 2 A side, plan and front view of a single fuselage, single wing, twin engine airplane.
Figure 2B:
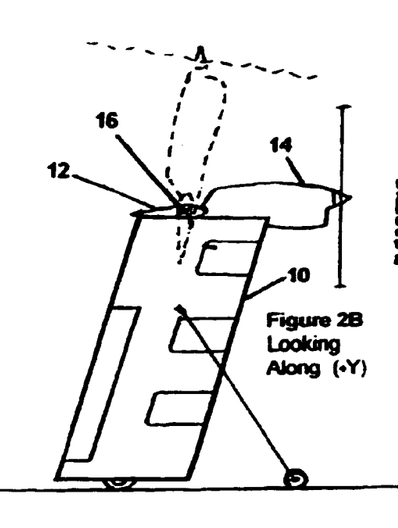
Figure 2C:
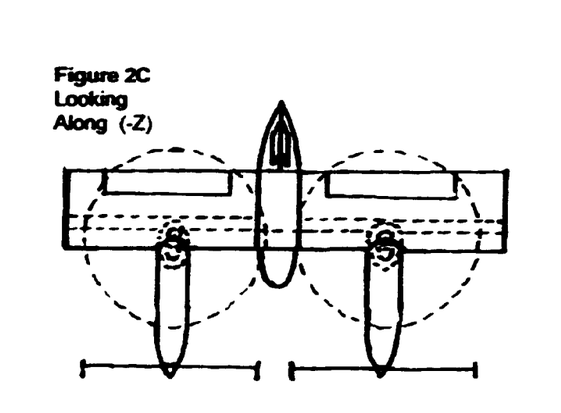
Figures 3, 3C:
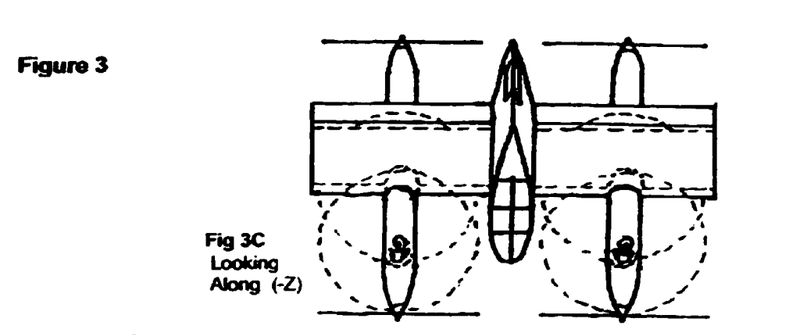
FIG. 3 A side, plan and front view of a single fuselage, twin wing, four engine airplane.
Figure 3A:
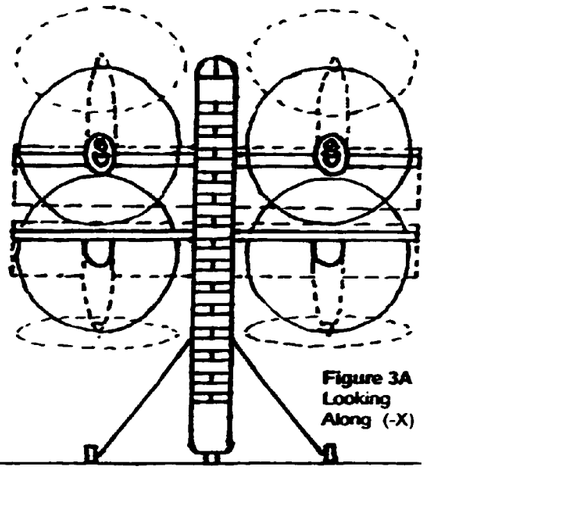
Figure 3B:
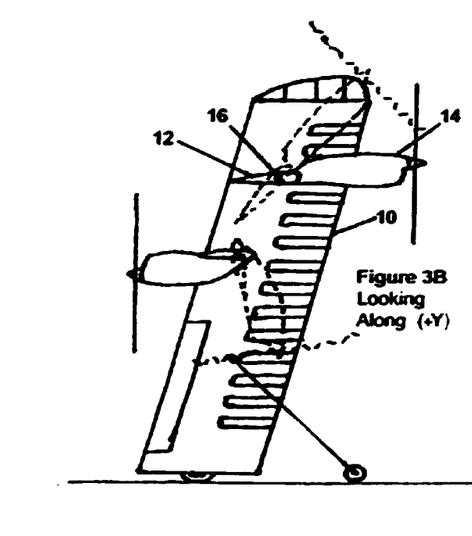
Figure 4:
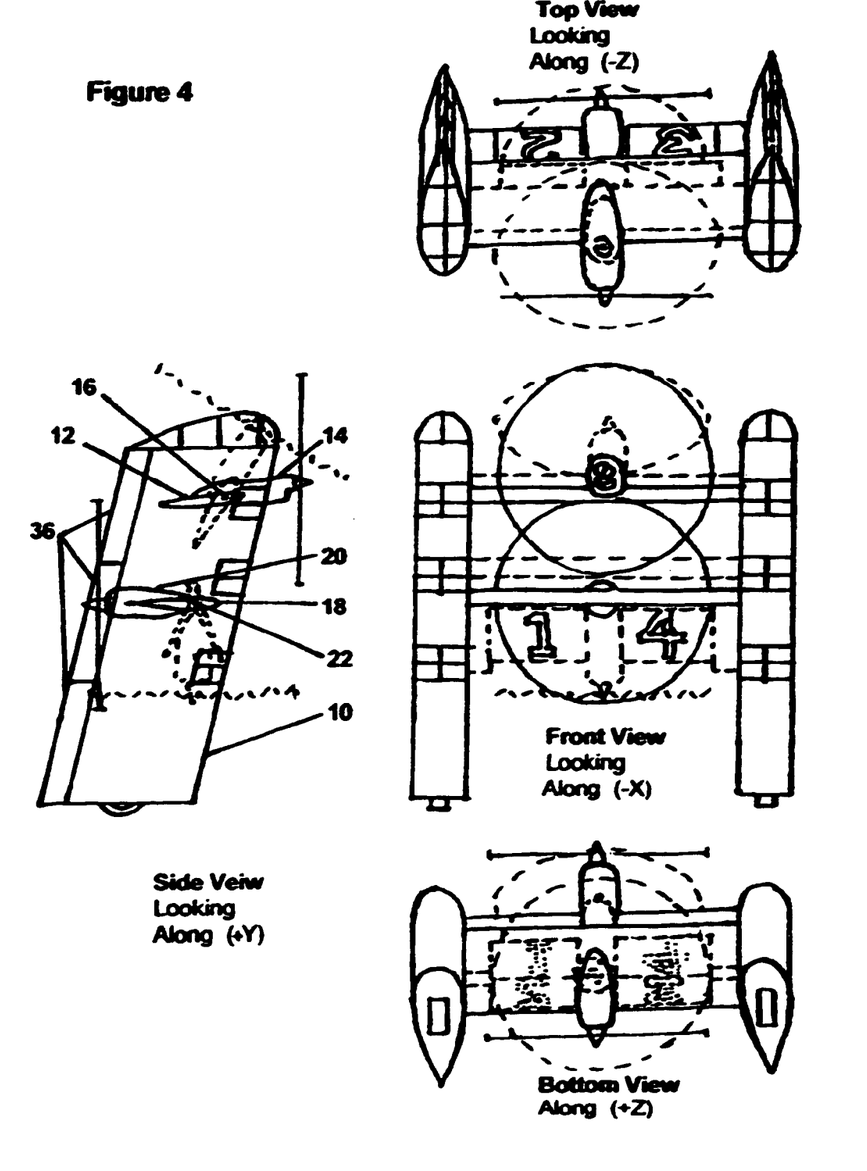
FIG. 4 A side, plan, front and bottom view of a twin fuselage, twin wing, twin-engine airplane that is the preferred embodiment.

The present design avoids or moderates many of the problems of previous designs. The present invention significantly improves stability of performance in takeoff, decent and landing over previous airplanes. The current design utilizes tall fuselage structure(s) to mount tilting wing and engine assemblies. This configuration provides maximum clearance from the ground and uses large propeller(s) for low disk loading which minimizes ground effects; thereby, reducing dynamic ground pressures (less than one-half of current designs) and producing low velocity boundary layers in the area around the aircraft. The high placement of the engine(s) will reduce the likelihood of ingesting re-circulating hot gasses or kicked-up ground debris. The simplest configuration is shown in FIG. 1 and shows three views of a single tall fuselage of airfoil plan-form topped with a single wing having a tractor-mounted engine on its leading edge. The wing and engine can tilt about a horizontal axis to point in the direction of flight during cruise flight and point skyward during takeoff and landing. Attitude control of this airplane during cruise flight will be by the use of wing trailing edge aerodynamic surfaces functioning as ailerons to provide roll control and the upper and lower halves can also be independently deployed (on the right side or left side of the airplane) as drag "brakes" to control yaw. The trailing edge of the vertical fuselage also has an aerodynamic surface that acts as a conventional rudder in horizontal flight or can be deployed as a drag "brake" for pitch control or for slowing airplane descent. A single fuselage, single wing, twin-engine design is shown in FIG. 2 and will require use of a cross-shaft for engine failure safety. Control during hover, landing and takeoff for the two preceding configurations may require adding a conventional rudder and differential elevator embedded in the propulsion means slipstream at the trailing edge of the tilting wing. FIG. 3 shows a single fuselage, twin wing, four engine layout, which will also need cross-shafts. FIG. 4 shows a twin fuselage, twin wing, twin engine version which will not require use of a cross-shaft. This last one is the preferred embodiment design and will be discussed further below.

The preferred embodiment twin fuselage configuration (FIG. 4) will present a minimum of interference with the spreading airflow on the ground. Locating both engines on the centerline of the airflow obviates the cross shaft coupling required on previous designs and one engine failure will not produce excessive yaw forces in cruise nor roll forces in hover. This also allows wing and engines to be independently pointed for greater thrust vectoring control. The single disk air stream avoids the "air fountain" effect (reflected air impinging on the central fuselage) common in two engine designs where the engines are on each side (e.g. the V-22). The upper tractor engine on the augmented lift tilting wing is primarily for vectored lift during take-off, hover, and vertical landing. Additionally, the tractor engine thrust is reversible using variable pitch propellers to assist in rapid descent. The pusher engine being pointed rearward helps negate the gyroscopic forces of the tractor engine and will assist in rapid descent also using variable pitch propellers. When in hover the location and attitude of the pusher propeller enhances the lift capability of the upper lift wing in that it assists in keeping airflow attached on the upper surface of that wing (enhancing the Coanda effect). The lower wing and engine structure provides all aerodynamic controls for translation and rotation of the airplane in cruise, transition and hover. The airplane can be configured for landing during glide slope decent; thereby, saving time and fuel. Variable pitch propellers on both engines can act as brakes and will help maintain low velocity during steep glide slope decent and landing approach. Controls on the lower wing can rapidly respond to translation and rotation of the hovering aircraft to facilitate gusty wind operations. Design can move itself around on the ground. On one engine it can operate as a STOL airplane.

BRIEF DESCRIPTION OF THE DRAWINGS

(FIGS. 5, 6, 7, and 8 ignore the right fuselage in side views to better show the function of the interior aerosurfaces and propulsion means.)

(FIG. 9 shows how functional structural elements are configured about the medial plane of symmetry in take-off orientation and in horizontal flight orientation.)

LIST OF DRAWING NUMBERS

1. Aerodynamic surface on lower side of right lower wing (dynaron).
2. Aerodynamic surface on upper side of right lower wing (dynaron).
3. Aerodynamic surface on upper side of left lower wing (dynaron).
4. Aerodynamic surface on lower side of left lower wing (dynaron).
10. Fuselage structure
12. Upper (lift) wing
14. Tractor engine on upper wing
16. Upper (lift) wing rotation axis
18. Lower wing (dynaron)
20. Pusher engine of lower wing
22. Lower wing (dynaron) rotation axis
36. Aerodynamic surface(s) of trailing edge of fuselage(s)
38. Wings extending outboard of the vertical fuselage structures
39. Booms that are attached to the tilt wings whereon aero surfaces are attached to provide airplane attitude control
40. Aero surfaces that function as conventional "rudder" (yaw control) when the airplane is in horizontal flight.
41. Aero surfaces that function as conventional "elevator" (pitch control) when airplane is in horizontal flight.

SUMMARY OF THE INVENTION

A vertical takeoff and landing (VTOL) airplane is described which is tall rather than long. This new configuration facilitates placing the propulsion engines at a maximum distance from the ground. It further allows improved motion and attitude control during takeoff and landing. The preferred embodiment, shown in FIG. 4, of the airplane consists of twin vertical cargo/passenger fuselage structures 10 having a thick airfoil shape in plan view. Near the top is a horizontal lifting wing 12 spanning the space between the vertical fuselage structures. A tractor propulsion engine 14 is attached to the leading edge of this lifting wing. The wing and engine can tilt as a unit around a horizontal axis 16 thereby changing the thrust and lift direction. The assembly tilts to point the engine skyward for takeoff and for landing touchdown. For cruise this assembly is tilted to point the engine so that the thrust is horizontal to the ground in the direction of cruise flight. Utilizing the twin fuselage structures and upper wing, one might incorporate a deployable parachute type lift system for descent or in an emergency to save the lives of passengers and crew. A second aerodynamic "wing" 18 and engine 20 assembly spans the space between the airfoil shaped twin fuselages and is below and behind the lifting wing. This second engine faces to the rear and is a pusher. The second wing and engine assembly can independently tilt also about a horizontal axis 22 (which is parallel to the lift wing axis 16). The engine will be pointed down during takeoff and landing and it will be horizontally positioned to point rearward for cruise. This second wing can contribute lift but it also serves as the primary means of aircraft maneuvering and attitude control as explained in the following section. An important advantage of the present configuration is that no mechanically complicated cyclic control systems are required for the propellers.

DESCRIPTION OF AIRCRAFT FLIGHT CONTROL SYSTEM

VTOL airplanes must maintain control in three directions of translation around three rotational axes. The problem most frequently faced is trying to maintain these controls in gusty wind conditions. The greatest differential velocity changes are in the average direction of the wind. Vertical components can also be fairly large. Variations in the horizontal plane at right angles to the average wind direction are fairly low unless there are large vertical structures nearby. The present design concentrates on providing rapid and effective control in speed variations in the vertical and heading directions and assumes the pilot will expect difficulties if he tries to hover over a particular spot, close to the ground, in strong gusty cross winds. Gusty winds are a major hazard to VTOL airplanes because they aggravate aerodynamic instabilities resulting from operating close to the ground. This design reduces the problem of operations in gusty winds in three principle ways. First, the propulsion and lift surfaces are high off the ground: thereby, reducing ground effects. Second, the fuselage configuration, with its single air stream, avoids the "air fountain" effect, which have posed problems in prior design approaches. Third, the aerodynamic surface control system provides rapid application of corrective force to counter the effects of gusty winds. The function of the control system in maneuvering and attitude control of the airplane is very important. In hover mode it simultaneously controls the height, compass heading, and the speed and acceleration in the plane parallel to the ground while the airplane holds a fixed heading. The preferred embodiment configuration will be discussed in some detail. This section describes the way this airplane is controlled in flight. The description starts with what happens in cruise flight and then explains how things change for hover operations.

Figure 6:
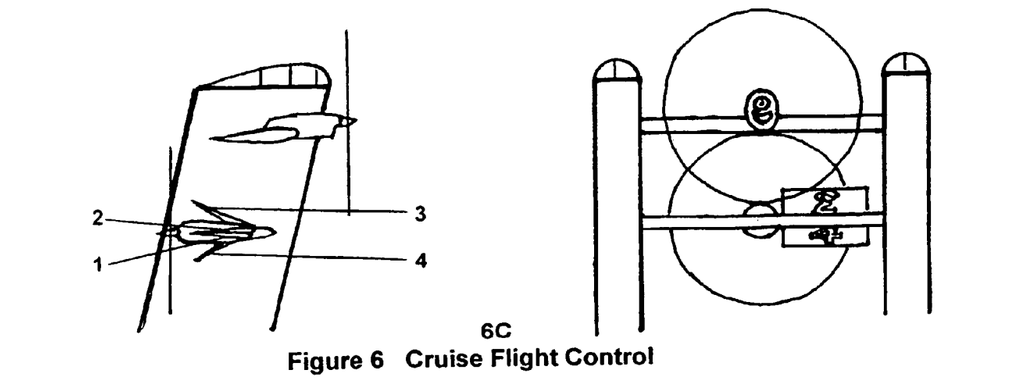
FIG. 6 Cruise flight control. (6A–6C)

In cruise flight shown in FIG. 6, the lift wing 12 and its tractor-mounted engine 14 points in the direction of flight. The lower wing 18 and its pusher-mounted engine 20 also provide lift and thrust in the horizontal plane of flight. When the attitude of the airplane must be changed, aerodynamic surfaces on the lower wing 18 deploy to exert the required force on the vehicle to change its flight path. This lower wing 18 and its control surfaces have been given the name "dynaron"[1]. The lower second wing 18 provides rapid response to attitude disturbances caused by the flight environment. FIG. 6 shows that the dynaron consists of four movable mechanical aero-surfaces: a right lower surface 1, a right upper surface 2, a left upper surface 3, and a left lower surface 4. These surfaces are used in various positions to control the aircraft, both on the ground and in the air. FIG. 6a depicts the upper wing 12 and its tractor engine 14 pointed in the direction of flight and the lower wing 18 and its pusher engine 20 aligned for cruise. FIG. 6a shows the aero-surfaces on the dynaron partially deployed (in dashed lines to clarify their location) acting as aero brakes. The drawing numbers are also indicated as though they had been painted on the movable surfaces. FIG. 6b shows the dynaron surfaces deployed about horizontal axes parallel to the wing rotation axis 16 of wing 18 to achieve airplane roll to the right. FIG. 6 adopts the conventional aircraft coordinate system so the sketched frontal views are looking along the—x axis so to an observer riding in the airplane FIG. 6b would sense a clockwise roll about x. The two aero-surfaces on the left, the upper surface 3, and the lower surface 4, are rotated together downward and the two on the right, the lower surface 1, and the upper surface 2, are rotated together upward and function much like ailerons on a conventional airplane. FIG. 6c shows dynaron surface deployment to exert a correction in yaw. The right pair of aero-surfaces 1 and 2 are shown closed in a normal airfoil shape and the left pair 3 and 4 are rotated an equal amount in opposite directions resulting in an "air-brake" action on the left side which will tend to produce a negative yaw (counter-clockwise) of the airplane. Pitch changes in cruise can be controlled by rotating both left and right dynaron pairs in the same direction up or down. All three axes can be effected simultaneously by mixing the settings described above to provide the pilot with full-time control. The trailing edge of the upper wing 12 might also be equipped with active aero-surfaces (e.g. conventional elevons) to control airplane attitude by adding to the lift enhancements (flaps) envisioned for that wing. An interesting performance enhancement is to employ advanced propeller technology to stop the upper engine during cruise, adjust the blades thereof to contribute lift and control then operate only on the pusher propulsion means or additionally, reduce drag by folding the upper propeller (rotor) during horizontal flight. Trailing edges of the fuselage(s) can also be equipped with aero-surfaces to provide roll, yaw, pitch and aero-braking in pairs or in multiple (e.g., upper and lower) sets (FIG. 4, Item 36) to control pitch as in all configurations of the tall V/STOL aircraft. It is expected that this airplane will utilize "fly-by-wire" technology with an integrated automatic flight control system to assist the pilot.

[1] "Dynaron" meaning "power wing".

Figures 5, 5A, 5G:
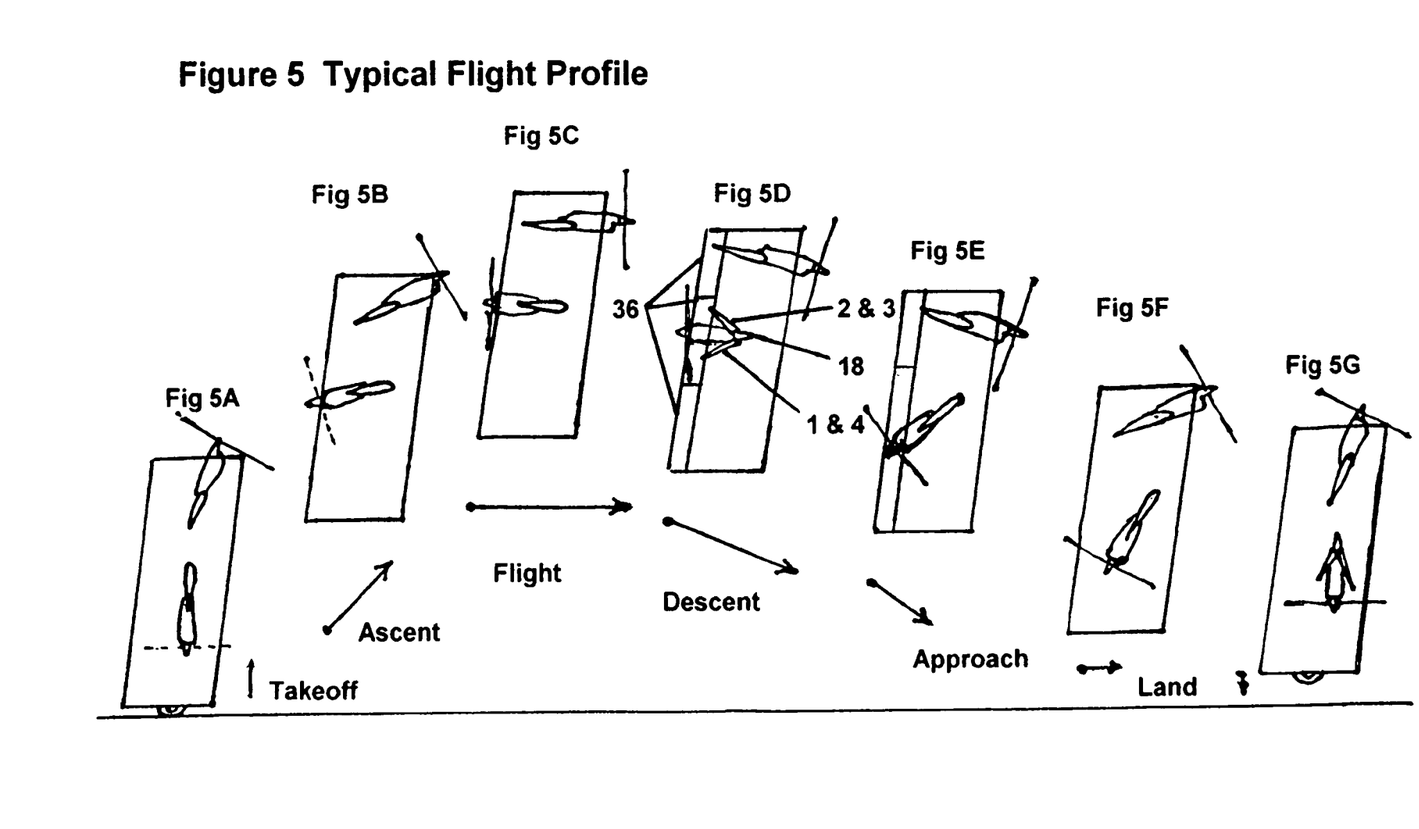
FIG. 5 Typical flight profile. (5A–5G)

As this VTOL airplane transitions from cruise configuration into hover and landing, the functions of control system components undergo an angular shift of 90 degrees around the pitch axis. Aerodynamic surfaces that effect the pitch of the airplane will continue that same function but roll and yaw will be interchanged. The aerodynamic surface motion that changed roll in cruise will change the yaw in hover. Aerodynamic surface motions that changed yaw in cruise will change roll in hover. During hover, depicted in FIG. 7, the lift wing 12 and its propulsion system 14 will be pointed skyward and the dynaron wing 18 and its attached propulsion system 20 will be tilted so that air will be blown downward. The lift wing 12 may have high-lift augmentation devices, such as geometry change, e.g. leading and trailing edge flaps, or boundary layer controls to enhance its thrust vectoring function. The location and operation of the dynaron 18 and pusher engine 20 will further enhance the performance of the lift wing by helping maintain attached airflow to the upper surface of the lift wing 12. At the completion of the cruise flight, altitude decent will be initiated by reducing propulsion power, deploying lift augmentation devices on the lift wing to increase drag and the dynaron wing can also deploy lift augmentation means and may be configured as a "brake" using dynaron surfaces 1,2,3 and 4 shown in FIG. 5d to help dissipate the potential and kinetic energy of the aircraft as it descends. With lift augmentation on the upper lift wing, dynaron aero-surfaces and fuselage aero-surfaces deployed as aero-braking elements (FIG. 5d) the pusher propeller is ideally situated to efficiently utilize reverse thrust to facilitate controlled steep descent glide paths. The lift wing 12 and the dynaron 18 may both be pointed slightly downward (FIG. 5d) to maintain the passenger compartments in a comfortable upright position. As touchdown is approached the lift wing 12, the dynaron 18 and the body air brakes 36 will be configured for maximum reduction in airspeed so that the wings can be tilted back (transition) into the same hover attitude as during takeoff. This will be a smooth transition of flight regimes since the center of gravity remains below the center of lift at all times. Engine thrust and the dynaron aerodynamic controls will be used for final approach maneuvering and landing.

Figure 7A:
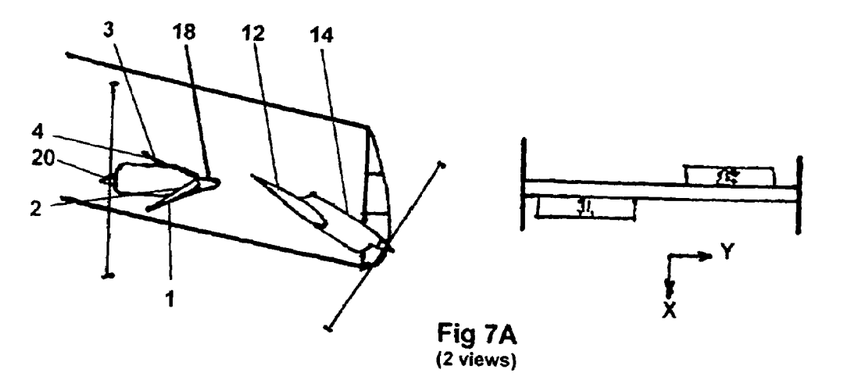
FIG. 7 Hover flight control. (7A–7B)
Figure 7B:
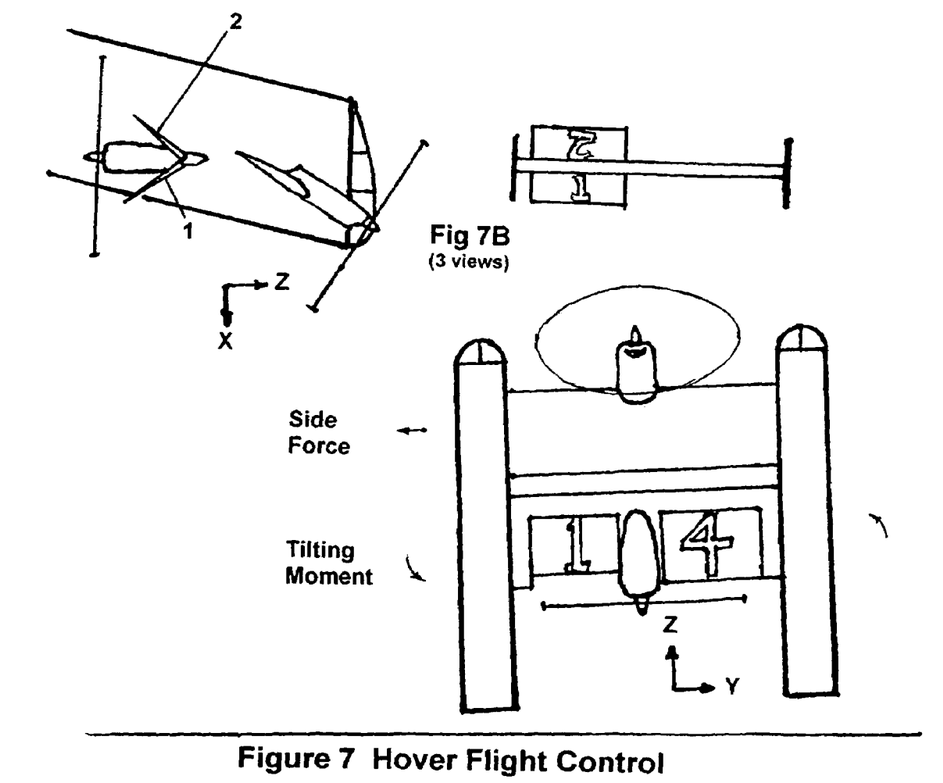
Figure 8:
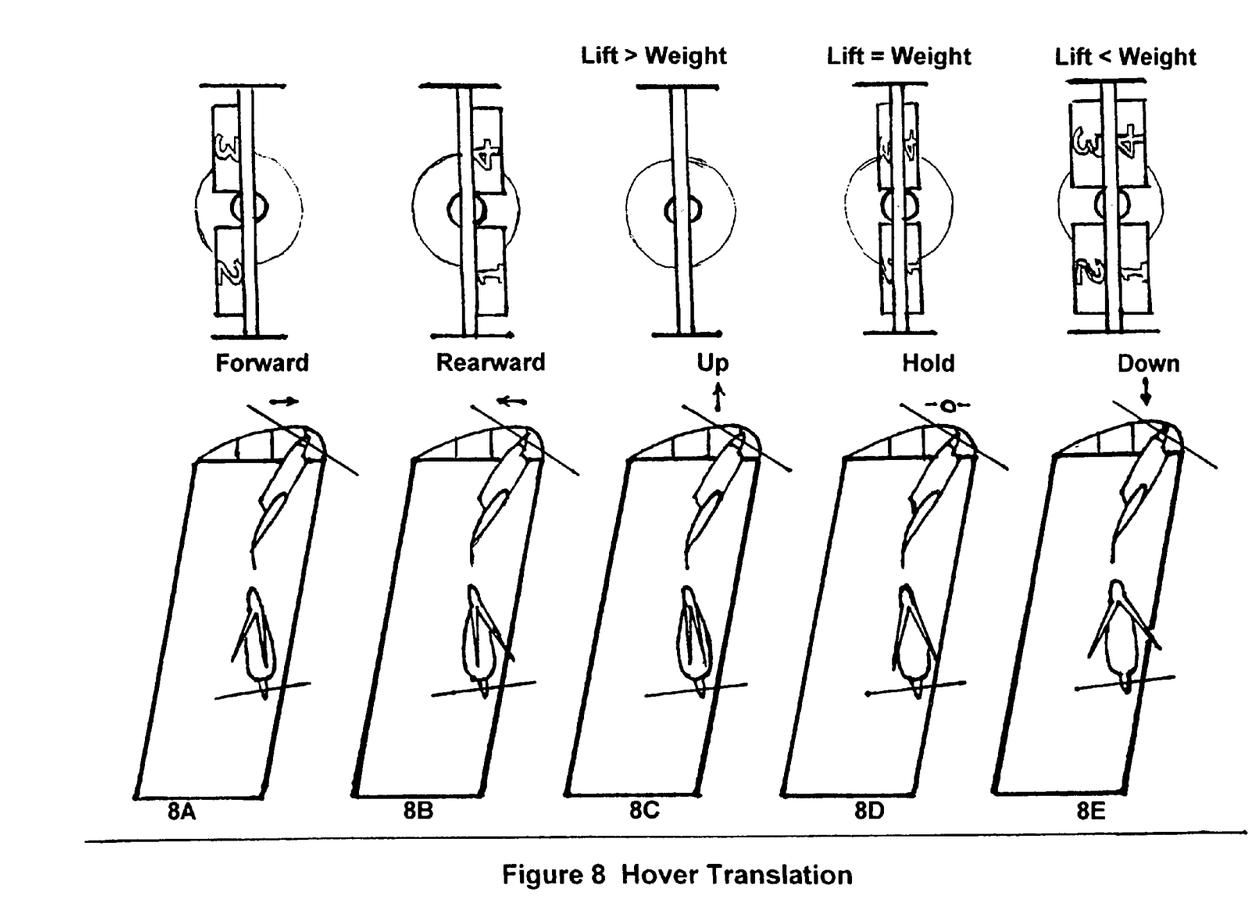
FIG. 8 Hover flight translation control. (8A–8E)

As the airplane enters hover flight the pilot must be able to move authoritatively to a selected landing spot. This ability to maneuver low and slow near the ground will result in safer overall operations provided the airplane can deal with gusty wind conditions. Tilting the lift means will facilitate large motion forward and aft and its integral thrust means forward or aft as needed. FIG. 7 shows how the downward pointing dynaron provides rotational control in yaw and roll. FIG. 7a shows how the dynaron will be used to provide near touchdown control where the right pair of surfaces 1 and 2 are rotated together rearward and the left pair of surfaces 3 and 4 are rotated forward. This produces a clockwise turning moment on the airplane. The position of these dynaron surfaces would be reversed to produce a counterclockwise turning moment. This is how yaw is controlled during hover and landing operations. FIG. 7b consists of three sketches showing how the airplane is rolled in hover. The left pair of dynaron surfaces 3 and 4 are closed to minimize drag and the right pair of dynaron surfaces 1 and 2 are rotated in opposite directions to produce drag on the right side. As indicated in the FIG. 7b frontal sketch, viewing along the—x axis, this will roll the airplane so that the lift vector produces movement over the landing site to the right or it may be used to resist a side-wind to remain over a fixed spot. FIG. 8 shows how the dynaron produces translation in hover. The lift thrust of the two tilting wing-engine structures can be set, i.e. tilted forward or rearward, to oppose the average wind force with the dynaron surfaces pointing along the stream of air. If the pilot wants to move forward or a momentary gust of wind presents a force that tries to push the airplane backward, the two dynaron aero surfaces 2 and 3 can move in the same rotational direction in the air slipstream as shown in FIG. 8a to oppose that force. And likewise, if the wind velocity suddenly drops, the dynaron aero surfaces 1 and 2 can rotate in the opposite direction as shown in FIG. 8b to compensate and maintain the aircraft position relative to the ground. Vertical force components of gusty winds can be very disruptive to the stability of VTOL airplanes and must be dealt with very rapidly because they upset attitude control and disruptive airflow instabilities have resulted in loss of vehicle and life. The dynaron wing deals with vertical force variations by sacrificing some lift. When hovering, the top aero surface and the bottom aero surface of the dynaron wing separate as shown in FIG. 8d to act as an air brake to produce increased drag in the airflow. When gusts try to push the airplane into the ground the operator can quickly close the two surfaces as shown in FIG. 8c reducing the drag to achieve an opposing force; thereby, maintaining altitude. If the gust results in an upward force, the operator opens the two surfaces more as shown in FIG. 8e, resulting in greater drag force to compensate by pulling the airplane down. Lateral, or side-to-side, motions of the airplane due to gusty conditions are expected to be a minimum during takeoffs and landings when the airplane will be pointing into the wind. As described above lateral velocity can be maintained by differentially operating the right side opening of the two surfaces and the left side surfaces to produce and hold a constant roll angle of the airplane (see FIG. 7b). The lift vector being slightly tipped to the side will maintain a steady velocity into this side wind. If operational experience indicates that a rapid side-to-side response is needed it would be possible to add another aerodynamic control surface to the dynaron wing resembling a conventional rudder (when viewed in cruise configuration) just in front of the pusher engine which could rapidly produce side forces. The dynaron has an overall effect, that during hover, the partially opened surfaces, which independently rotate and open, can completely control attitude and position with respect to the ground quickly and with great authority.

Figure 9:
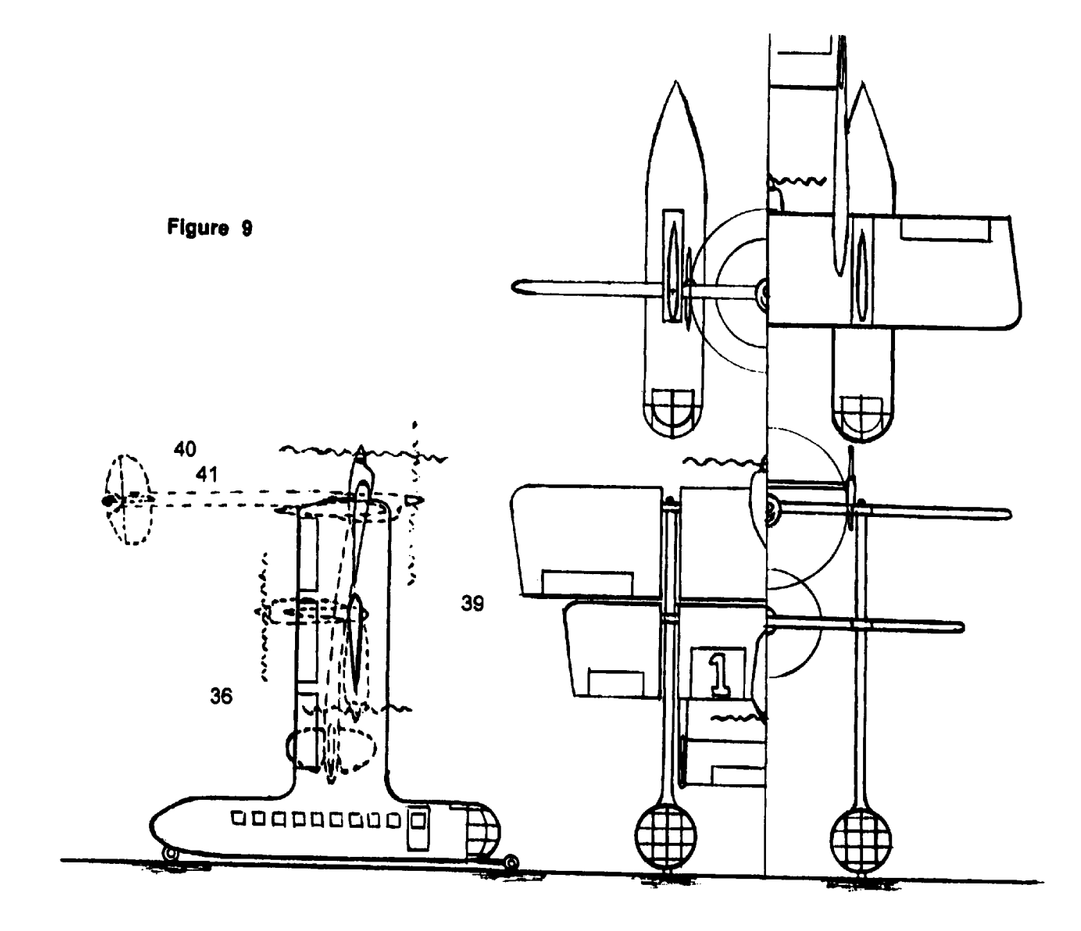
FIG. 9 A side, plan and front view of a twin fuselage, twin wing, twin engine airplane that is the preferred embodiment showing design detail variations.

A tall V/STOL aircraft is shown in FIG. 9 utilizing a fuselage having thin airfoils in plan view at high elevations with large area in plan view closer to the ground to improve loading and unloading of cargo and passengers and to better facilitate pressurizing the cabin for high altitude operation of the aircraft. FIG. 9 anticipates use of wings 38, both upper and lower, that extend outboard of the vertical structures and are free to rotate independently about the same axis as the wings between the vertical structures. FIG. 9 also indicates twin booms 39 that facilitate the mounting of conventional rudders 40, one at the end of each boom, and an elevator aero surface 41 spanning between the booms, said booms are fixedly attached to and rotate with the upper tilt wing for horizontal flight control. The booms in FIG. 9 are shown long enough that the elevator aero surface 41 cannot interfere with the lower wing pusher propeller when rotated into vertical take-off and landing position. The rudder aero surface(s) 40 controls yaw in horizontal flight."

I claim:

1. A tilt wing and short takeoff and landing (V/STOL) aircraft having a tall (vertical) fuselage of streamline shape in plan view with its chord pointing forward exhibiting variable area with height above the ground having a right side surface, a rounded leading edge surface, a left side surface and a sharp trailing edge containing at least two sets of aero-surfaces disposed vertically along the trailing edge, each set consisting of at least two elements, one on each side of the fuselage, freely rotatable about a line parallel to the fuselage trailing edge to be deployed during horizontal cruise flight to act as rudders when both sets move together in the same direction, said set acting as aero-brakes when elements of the sets are operated differentially, and said set acting as pitch control of the aircraft when the respective vertical sets are operated at different differential amounts, a single wing near the top of the tall fuselage, the span of said wing being equal distance on each side of and orthogonal to the chord of said fuselage, freely rotatable about an axis parallel to the ground and orthogonal to the chord of said fuselage to facilitate pointing the chord of said wing vertical for takeoff and landing operations and in a horizontal direction for horizontal flight having a lower surface, leading edge surface, upper surface and a sharp trailing edge with at least two sets of aero-surfaces one set on each side of the fuselage each set consisting of at least two elements one on the top surface of the wing and the other on the bottom surface of the wing both freely and independently rotatable about an axis essentially parallel to the wing span said sets being spaced equidistant outboard of the centerline on respective sides of the fuselage, in level cruise flight acting as conventional ailerons when said elements are moved together in opposite directions on each side of the fuselage, and said elements acting as lift augmentation devices when operated together in the same direction on both right and left of the fuselage and said elements acting as aero-brakes when said elements are operated differentially on respective sides of the fuselage, said wing having boom mounted aero-surfaces fixedly mounted to the center of the tilt wing and engine structure extending in the direction of the wing chord aft of the trailing edge having aero-surfaces acting as conventional elevator and rudder in horizontal cruise flight, a propulsion means consisting of an engine and tractor mounted variable pitch propeller extending forward of the leading edge of the tilting wing points up during takeoff and landing and horizontal during horizontal cruise flight.

2. A tilt wing vertical and short takeoff and landing (V/STOL) aircraft described in claim 1 with conventional elevator and rudder aero-surfaces in horizontal flight fixedly mounted to the tilt wing/engine structure aft of the trailing edge of the tilt wing on two booms one on each side of the single fuselage separated by at least a distance allowing clearance with the fuselage structure and allowing unimpeded performance of all aero-surfaces when it is positioned for V/STOL operation.

3. A tilt wing vertical and short takeoff and landing (V/STOL) aircraft described in claim 1 with two propulsion means with variable pitch feathering propellers mounted on the single tilt wing structure at equal lateral distances from the fuselage with a cross shaft drive provision for in-flight engine failure safety.

4. A tilt wing vertical and short takeoff and landing (V/STOL) aircraft described in claim 1 with an upper wing with two propulsion means optimized for takeoff, landing and hover performance one mounted on each side of the fuselage with cross shaft drive provision for in-flight engine failure safety, a second tilt wing mounted below the topmost wing the span of said second wing being parallel with the upper wing, said second wing having two pusher propulsion means optimized for high speed flight one on each side of the single fuselage with cross shaft drive provision for feathering propellers for in-flight engine failure safety, both wings freely rotatable about an axis parallel to the ground and orthogonal to the chord of the fuselage to facilitate pointing the leading edge of both wings vertical for takeoff and landing operations and in a horizontal direction for horizontal flight, each wing having a lower surface, leading edge surface, upper surface and a trailing edge with at least two sets of aero-surfaces each set consisting of at least two elements one on the upper wing surface and one on the bottom wing surface freely rotatable about an axis essentially parallel to the wing span said sets being spaced outboard of the centerline on respective sides of the fuselage in level cruise flight acting as conventional ailerons when said elements are moved together in opposite directions on each side of the fuselage, and said elements acting as lift augmentation devices when operated together in the same direction on both right and left of the fuselage and said elements acting as aero-brakes when said elements are operated differentially on both sides of the fuselage, said wings having booms with aero-surfaces fixedly mounted to the wings extending in the direction of the wing chord aft of the trailing edge acting as conventional elevators and rudders in horizontal cruise flight.

5. A tilt wing vertical and short takeoff and landing (V/STOL) aircraft configured as described in claim 4 above having large diameter propellers on the uppermost wing for efficient performance during takeoff, landing and hover operation when the upper wing is pointed vertically said propellers able to feather and fold during horizontal flight to reduce aerodynamic drag when the wing is horizontal, lower wing having variable pitch smaller diameter propellers optimized for efficient high speed horizontal flight.

6. A tilt wing vertical and short takeoff and landing (V/STOL) aircraft having two tall side-by-side fuselages carrying operators, passengers and cargo said fuselages separated laterally by the center segment of an upper tilting wing equipped with an engine and a large air screw capable of folding and feathering located midway between the fuselages and a lower tilting wing with a propulsion means located on the trailing edge of the lower wing midway between the fuselages optimized for high speed horizontal flight each of the two tall fuselages of streamline shape in plan view with its chord pointing forward exhibiting variable area with height above the ground having a right side surface, a rounded leading edge surface, a left side surface and a sharp trailing edge, said trailing edge of both fuselages contain at least two sets of aero-surfaces disposed vertically along the trailing edge, each set consisting of at least two elements, one on each side of the fuselage, freely rotatable about a line parallel to the fuselage trailing edge to be deployed during horizontal cruise flight to act as rudders when both sets move together in the same direction, and said elements acting as aero-brakes when elements of the sets are operated differentially, and said elements acting as pitch control of the aircraft when the respective vertical sets are operated at different differential amounts, the span of said upper wing being orthogonal to the chord of said fuselage, freely rotatable about an axis parallel to the ground and orthogonal to the chord of said two fuselages to facilitate pointing the chord of said wing vertical for takeoff and landing operations and in a horizontal direction for horizontal flight said wing having a lower surface, leading edge surface, upper surface and a sharp trailing edge with at least two sets of aero-surfaces each set consisting of at least two elements one on the top surface of the wing and the other on the bottom surface of the wing both freely rotatable about an axis essentially parallel to the wing span-line said sets being spaced outboard of the center point of the wing acting as conventional ailerons when said elements are moved together in opposite directions on each side of the center mounted propulsion means, and lift augmentation devices when operated together in the same direction on both right and left of the propulsion means and aero-brakes when said elements are operated differentially on both sides of the propulsion means, said upper wing will have boom mounted aero-surfaces fixedly mounted to the wing and engine structure extending in the direction of the wing chord aft of the trailing edge having aero-surfaces acting as conventional elevator and rudder in horizontal cruise flight, a propulsion means consisting of an engine and tractor mounted variable pitch feathering and foldable large propeller extending forward of the leading edge of the upper tiling wing points up during takeoff, landing and hover operations and forward during horizontal cruise flight, the lower tilt wing having aero-surfaces similar to the upper tilt wing described above and a mid-span mounted rearward pointing pusher propulsion means optimized for high speed flight, both upper and lower wings extend outboard of the fuselages to provide lift and attitude control being freely and independently rotatable about the same axis as the wings between the fuselages.

\* \* \* \* \*